US007116267B2

(12) United States Patent
Schuster et al.

(10) Patent No.: US 7,116,267 B2
(45) Date of Patent: Oct. 3, 2006

(54) METHOD FOR GENERATING CALIBRATION SIGNALS FOR CALIBRATING SPATIALLY REMOTE SIGNAL BRANCHES OF ANTENNA SYSTEMS

(75) Inventors: Manfred Schuster, Illertissen (DE); Franz Herrmann, Oepfingen (DE)

(73) Assignee: EADS Deutschland GmbH, Ottobrunn (DE)

( * ) Notice: Subject to any disclaimer, the term of this patent is extended or adjusted under 35 U.S.C. 154(b) by 268 days.

(21) Appl. No.: 10/756,754

(22) Filed: Jan. 14, 2004

(65) Prior Publication Data

US 2004/0207554 A1 Oct. 21, 2004

(30) Foreign Application Priority Data

Jan. 14, 2003 (DE) ................................ 103 01 125

(51) Int. Cl.
*G01S 7/40* (2006.01)
*H01Q 3/22* (2006.01)
*H01Q 3/26* (2006.01)

(52) U.S. Cl. ...................... 342/174; 342/165; 342/173; 342/175; 342/195; 342/368

(58) Field of Classification Search ........ 342/165–175, 342/195, 368–377, 380; 343/729; 455/67.11, 455/67.14
See application file for complete search history.

(56) References Cited

U.S. PATENT DOCUMENTS 4,488,155 A * 12/1984 Wu ............................ 342/376
4,642,642 A * 2/1987 Uurtamo ..................... 342/174
5,530,449 A * 6/1996 Wachs et al. ............... 342/174
5,644,316 A * 7/1997 Lewis et al. ................ 342/174
5,940,032 A * 8/1999 Passmann et al. .......... 342/372
6,157,343 A * 12/2000 Andersson et al. ......... 342/371
6,295,027 B1 * 9/2001 Wixforth et al. ............ 342/368
6,339,399 B1 * 1/2002 Andersson et al. ......... 342/372
6,448,939 B1 * 9/2002 Maruta ....................... 342/380
6,480,153 B1 * 11/2002 Jung et al. .................. 342/368
6,747,595 B1 * 6/2004 Hirabe ....................... 342/174
6,762,717 B1 * 7/2004 Hirabe ....................... 342/368
6,917,786 B1 * 7/2005 Mizuguchi ............... 455/67.14
2001/0020919 A1 * 9/2001 Maruta ....................... 343/729

FOREIGN PATENT DOCUMENTS

| | | | |
|---|---|---|---|
| DE | 69601636 | T2 | 8/1999 |
| DE | 19948039 | A1 | 5/2000 |
| DE | 19806914 | C2 | 1/2002 |
| EP | 1367670 | A1 * | 12/2003 |

OTHER PUBLICATIONS

Copy of German office action with partial English translation.

* cited by examiner

*Primary Examiner*—Bernarr E. Gregory
(74) *Attorney, Agent, or Firm*—Crowell & Moring LLP

(57) ABSTRACT

The invention concerns a method for generating calibration signals for calibrating spatially remote signal branches of antenna systems. In accordance with the invention, a base signal is generated by mean of a timer and is fed to a distributor unit for distribution of the base signal to amplifier circuits on the signal distribution lines respectively allocated to them. At the output of the amplifier circuits, a calibration signal is generated respectively via amplification of the base signal within a specifiable upper amplitude limit and a specifiable lower amplitude limit, which is fed to the respective feed-in point of the signal branch to be calibrated that is allocated to an amplifier circuit.

15 Claims, 3 Drawing Sheets

METHOD FOR GENERATING CALIBRATION SIGNALS FOR CALIBRATING SPATIALLY REMOTE SIGNAL BRANCHES OF ANTENNA SYSTEMS

CROSS-REFERENCE TO RELATED APPLICATIONS

This application claims the priority of German application 103 01 125.0, filed Jan. 14, 2003, the disclosure of which is expressly incorporated by reference herein.

BACKGROUND OF THE INVENTION

The invention concerns a method for generating calibration signals for calibrating spatially remote signal branches of antenna systems.

In calibrating signal branches of antenna systems, the calibration signals are usually centrally generated with the corresponding frequency at which the calibration should be conducted. Here it is problematic that the distributor lines have a dispersive behavior over the frequency. That is, the signal transit times are frequency and temperature-dependent, wherein the dependency is greater the higher the absolute frequency. Moreover a signal line has varying damping as a function of frequency, temperature, bending radius of the lines, and age.

Due to imprecise adaptations to impedance, standing waves arise in connection with known methods, resulting in a wave-like amplitude behavior of the signals. A calibration is consequently made difficult.

Known calibration measuring devices are usually stationarily incorporated into the antenna system to be gauged. The disadvantages here are the large amount of space required for the measuring devices and the complicated and changing environmental conditions, for example, when installing measuring devices in the wing tips of an airplane.

A further disadvantage is that with known systems, frequency-selective filters are used, which leads to an insufficient timing accuracy due to frequency-specific group transit times. Furthermore, these group transit times are temperature and age-dependent. Nonetheless, a high level of timing accuracy is required for certain measuring methods since time differences in the arrival of received signals at the various signal branches of the antenna system are relied upon for ascertaining the direction of reception. This is also referred to as the delta time of arrival method. The direction of reception is moreover an important criterion for localizing senders.

SUMMARY OF THE INVENTION

An object of the invention is to indicate a method with which it is possible to generate calibration signals for calibrating spatially remote signal branches of antenna systems whereby the transit time and amplitude fluctuations of the calibration signals are kept as low as possible.

The objective is accomplished in accordance with the description herein. In particular, a method is disclosed for generating calibration signals for calibrating spatially remote signal branches of antenna systems, wherein a base signal is generated by means of a timer and is fed to a distributor unit for distributing the base signal to amplifier circuits on the signal distribution lines respectively allocated to them, and wherein a calibration signal is respectively generated at the output of the amplifier circuits by amplifying the base signal within a specifiable upper amplitude limit and a specifiable lower amplitude limit, which is then fed to the respective feed-in point of the signal branch to be calibrated that is allocated to an amplifier circuit.

In addition, for the method disclosed herein, the amplifier circuit includes a calibration line switch that may be connected directly before the output amplifier, whereby the calibration line switch can be switched between a passage state and a signal-reflecting state, and whereby in the signal-reflecting state the signal transit time of the base signal is measured on the signal distribution lines with an evaluation unit, which is connected to a resistance matrix that is connected to the respective signal distribution line between the amplifier circuit and the distributor unit.

In addition, for the method disclosed herein, one or more additional amplifiers may be connected upstream in series from the output amplifier for the purpose of improving the edge steepness of the calibration signal.

In addition, for the method disclosed herein, the high frequency bandwidth of the additional amplifier connected upstream may be smaller or equal in relation to the output amplifier.

In addition, for the method disclosed herein, the base signal may be a pulse burst that is generated in a J/K flip-flop as a timer, so that the generated pulses have the same frequency, pulse width and pulse duty factor.

In addition, for the method disclosed herein, a low signal may be generated for ascertaining the lower amplitude limit, which is conducted through the distributor unit and the signal distributor lines to the amplifier circuits, and wherein an output voltage for the corresponding low signal is measured at the output of the amplifier circuits, whose calibration lead switches are connected in passage.

In addition, for the method disclosed herein, a high signal may be generated for ascertaining the upper amplitude limit, which is conducted through the distributor unit and the signal distributor lines to the amplifier circuits, and wherein an output voltage for the corresponding high signal is measured at the output of the amplifier circuits whose calibration line circuits are connected in passage.

In addition, for the method disclosed herein, the frequency-dependent output performance of a base signal may be calculated at the output of the amplifier circuit as follows:

$$P_{Output} = 10 * \log\left[\left[\frac{2*(U_{High} - U_{Low})}{\pi * \sqrt{2}}\right]^2\right] \Big/ IMP$$

with $U_{high}$: Output voltage high signal $U_{Low}$: Output voltage low signal IMP Impedance of the signal lines in Ohms In addition, for the method disclosed herein, the amplitude of a signal in a reception branch may be measured as follows:

The calibration line switch of the corresponding amplifier circuit is switched to passage, A base signal is conducted over the corresponding amplifier circuit and the reception branch to be calibrated, and the output of the corresponding signal is measured on the evaluation unit that is connected to the output of the reception branch to be calibrated, Determination of the ratio of the output circuit of the amplifier circuit and the output ascertained at the output of the reception branch.

In addition, for the method disclosed herein, the intrinsic transit time of a signal between the distributor unit and the amplifier circuit may be measured as follows:

The calibration line switch of the amplifier circuit to be gauged is switched into a signal-reflecting state, A base signal is conducted over the distributor unit simultaneously to the evaluation unit that is connected to the resistance matrix and through the signal distributor line to the amplifier circuit, whereby the resistance matrix forwards the signal reflected from the calibration line circuit to the evaluation unit, Measuring the transit time difference of both signals received in the evaluation unit, which corresponds to double the transit time between the distributor unit and the calibration line circuit.

In addition, for the method disclosed herein, the transit time of a signal in the signal branch to be calibrated may be measured as follows:

The calibration line circuit of the corresponding amplifier circuit is switched to passage, A base signal is conducted through the distributor unit at the same time to the evaluation unit and through signal distributor lines and the amplifier circuit to the feed-in point of the signal branch to be calibrated, whereby the output of the signal branch to be calibrated is connected to the evaluation unit, Measuring the transit time difference between both signals received in the evaluation unit, whereby the transit time of the signal in the corresponding signal branch corresponds to the temporal difference between the input time of the base signal from the resistance matrix at the evaluation unit and the input time of the calibration signal by the signal branch to be calibrated, minus the intrinsic transit time between the distributor unit and the calibration switch.

In accordance with the invention, a base signal is generated by means of a timer and is fed to a distributor unit for distribution of the base signal to amplifier circuits on signal distribution lines respectively allocated to them. Moreover, a calibration signal is generated in each case at the output of the amplifier circuits via amplification of the base signal within a specifiable upper amplitude limit and a specifiable lower amplitude limit, which is fed to the respective feed-in point of the signal branch to be calibrated, which is allocated to an amplifier circuit.

With the method of the invention, amplitude-stable high frequency (in the GHz range) calibration signals having a defined amplitude behavior with spatially distributed feed-in points can be generated in receiver branches that are to be calibrated. Moreover, accurately timed calibration signals can be generated at any desired frequencies, e.g., pulsed HF signals in the GHz range, with the method of the invention. In the 1 GHz to 20 GHz frequency range, the timing accuracy of the calibration signals specified in the invention lies in the sub-nanosecond range.

The base signal is, for example, generated with a clock divider and can be a pulsed signal (for time calibration) or a continuous signal (for amplitude calibration), with a frequency based upon the application ranging from 200 to 750 MHz (up to 5 GHz). A pulse burst generated in a J-K Flip-flop is advantageous for time calibration. Here the J-K flip-flop can be controlled by the output signal of the clock divider, for example. One advantage of this is that the pulse bursts always start in-phase and that all pulses of a pulse burst have identical pulse width and pulse duty factors as long as the reference timer pulse, for example, from the clock divider, has a constant frequency. In this way, it is guaranteed that a symmetrical pulse sequence is generated up to the band width limit.

The generation of calibration signals is accomplished by the amplification of the base signal in the output amplifier of the amplifier circuit. The output amplifier, also designated here as a driver amplifier, appropriately has a high band width. Using the driver amplifier, a rectangular signal with defined upper and lower limits, also designated as high and low level, and with a high edge steepness in the range of several picoseconds, is generated on the output of the letter amplifier circuit. One or more additional amplifier steps can be connected upstream in the circuit to improve edge steepness of the calibration signal (FIG. 2). The high frequency band width of the amplifier connected upstream to the output amplifier can advantageously be smaller than that of the output amplifier or equal to the high frequency band width of the output amplifier. The ratio moreover is directed according to the edge steepness to be generated, which is usually indicated by the so-called rise and fall time.

The frequency components of the calibration signal behave according to the Fourier series development:

$$U(t)=\alpha*\sin(t)=\tfrac{1}{3}*\alpha*\sin(3t)+\tfrac{1}{5}*\alpha*\sin(5t)+\ldots+\tfrac{1}{19}*\alpha*\sin(19t)+\ldots$$

wherein: $a=(U_{High}-U_{Low})*(2/\pi)$ with $U_{high}$: Output voltage of the high level $U_{Low}$: Output voltage of the low level An exemplary representation of the output performance of the individual harmonic frequencies is represented in FIG. 3.

A further advantage of the method of the invention is that the amplifier circuits have a short group transit time for generating rectangular signals. In particular, the group transit time of the driver amplifier amounts to less than 50 ps. In this way, a high timing accuracy of the calibration signal is attained. Since with the method of the invention, the amplifier circuit has no frequency-selective components, for example filters, the transit time dispersion of the calibration signal is small.

With the calibration method of the invention, a high measurement accuracy of the receiving time related to the antenna positions is consequently guaranteed owing to which the direction of reception of a signal can be precisely ascertained. One possible area of use for the method of the invention is, for example, a radar heat receiver or a panorama receiver (ESM), which must be ready to receive in all directions, as is well known. The high ascertainment accuracy of the direction of reception of a signal with the method of the invention consequently permits a precise ascertainment of the sender.

In order to record the transit time on the signal distribution lines which in particular are impedance-adapted lines, the amplifier circuit advantageously includes a calibration switch that is arranged directly in front of the respective driver amplifier. The calibration switch KLS is moreover advantageously switchable between a passage state and a signal-reflecting state. To determine the line running time, a pulse signal may be fed into the signal distribution line with a calibration switch KLS set to "reflecting," and at the same time the fed-in signal and the reflected signal component are measured with an evaluation unit that is connected to a resistance matrix switched into the respective signal distribution circuit between the amplifier circuit and the distributor unit. This evaluation unit is, for example, a high-speed broadband A/D transducer with a digital signal recorder connected downstream in series.

Here the use of a pulse signal with a pulse width that is smaller than the smallest double line transit time (transit time until arrival of the reflected signal components at the feed-in point) is expedient.

BRIEF DESCRIPTION OF THE DRAWINGS

The invention as well as further advantageous constructions of the invention will be explained below on the basis of the drawings, wherein.

DETAILED DESCRIPTION OF THE INVENTION

Figure 1:
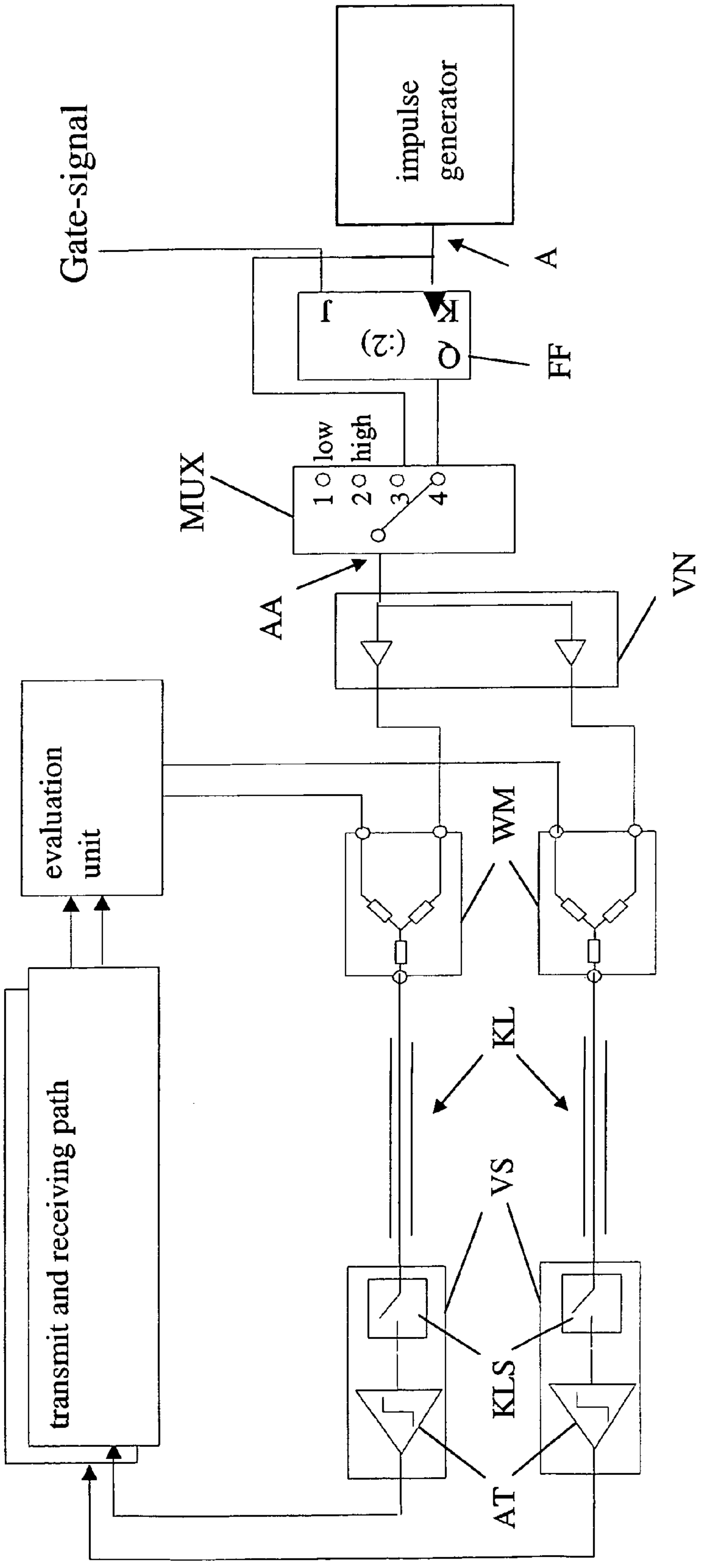
FIG. 1 Illustrates an exemplary circuit arrangement of a calibration circuit for implementing the method of the invention, FIG. 2 Illustrates an exemplary circuit arrangement of the amplifier circuit, FIG. 3 Illustrates an exemplary representation of the output performance of the individual harmonic frequencies.

The exemplary circuit arrangement of a calibration circuit for implementing the method of the invention illustrated in FIG. 1 includes a timer TG that generates a base signal with a specifiable reference timer pulse by means of an integral so-called clock divider. The output A of the timer TG is connected to the input K of a J/K flip-flop FF. The J/K flip-flop is a so-called controlled 2/1 frequency divider. Consequently it is possible with the flip-flop that is used to generate precisely equal pulses without having to undertake further adjusting operations on the generated pulses. Hence, it is guaranteed that all pulses are of equal length. Instead of a J/K flip-flop FF, however, a so-called delay line and a Schmitt trigger gate can also be used. A control signal (gate signal) is positioned at the other input J of the J/K flip-flop FF.

The output Q of the J/K flip-flop FF is connected to an input 4 of a multiple alternation switch MUX that is connected downstream in series. A further input 3 of the multiple alternation switch MUX is directly connected to the output A of the timer TG. A low signal is applied to the input 1 of the multiple alternation switch MUX, and a high signal is applied to the input 2 of the multiple alternation switch MUX.

The output AA of the multiple alternation switch MUX is connected to the input of the distributor unit VN, which distributes the base signal to several calibration lines KL. Each of the calibration lines KL includes a resistance matrix WM on one end and an amplifier circuit VS with an output amplifier AT and a calibration line switch KLS on the other end. The output amplifiers AT are connected to the inputs of the respectively allocated reception branches KE that are to be integrated. This connection is moreover sufficiently small in relation to the calibration lines KL. The outputs of the reception branches KE are connected to an evaluation unit AE.

The resistance matrices WM are moreover switched such that an applied base signal is conducted simultaneously through the resistance matrix WM to the calibration line KL and to the evaluation unit AE that is connected to the resistance matrix WM.

Figure 2:
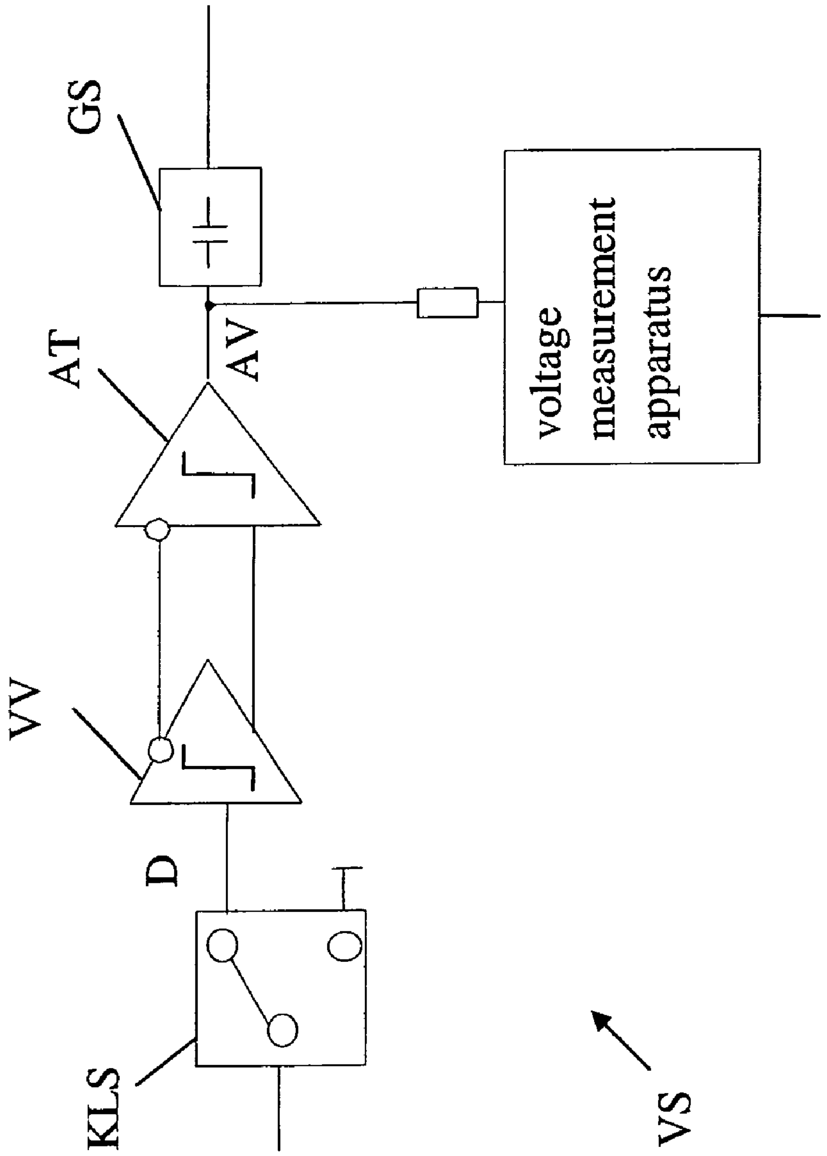
Figure 3:
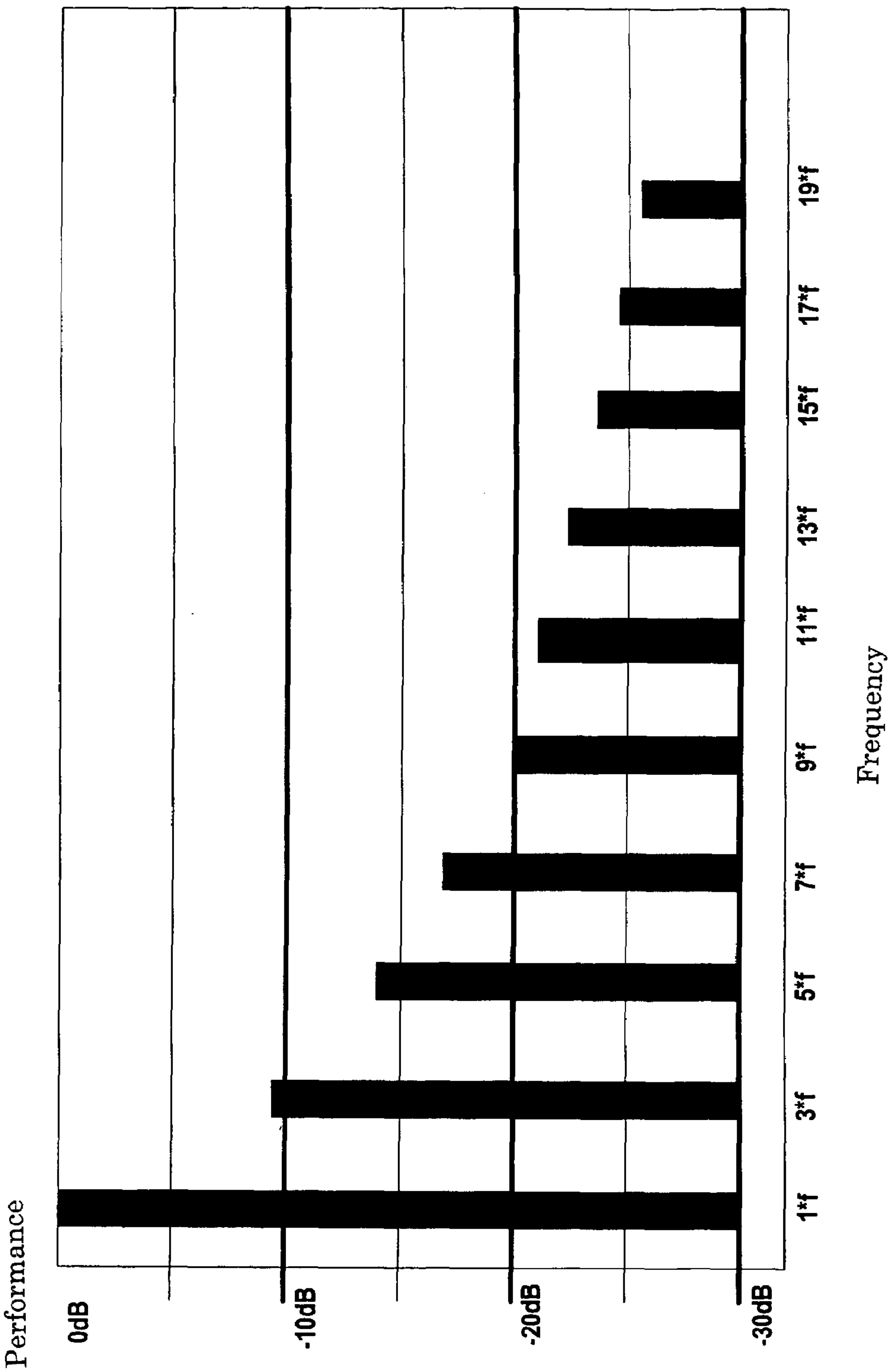

FIG. 2 illustrates an exemplary circuit arrangement of an amplifier circuit VS with a calibration switch KLS. Here, the calibration switch KLS is set to passage D, by way of example. A further amplifier VV is connected upstream in series to the output amplifier AT of amplifier circuit VS. In this way, it is guaranteed that the edge steepness of the output signal (calibration signal) is increased. The high frequency bandwidth of the amplifier VV connected in series upstream of the output amplifier AT can advantageously be smaller than that of the output amplifier AT or equal to the high frequency bandwidth of the output amplifier AT. A voltage measuring apparatus SE is connected on the output AV of the output amplifier AT by means of which the output voltages for high and low levels of the calibration signal are measured. Moreover, a voltage block GS, for example a condenser, is connected downstream from the output AV.

The measurement of the output voltage of reference signals at the output of the amplifier circuit includes the following operations:

Switching the multiple alternation switch MUX to input 1 to adjust the low level and set the calibration line switch KLS to "passage"

Transferring the static low signal to the output amplifier AT through a calibration line KL Measuring the output voltage of the output amplifier AT for the low signal on the voltage measurement apparatus SE Switching the multiple alternation switch MUX to input 2 to set the high level Transfer of the static high signal to the output amplifier AT through a calibration line KL Measurement of the output voltage of the output amplifier AT for the high signal of the voltage measurement apparatus SE Calculation of the frequency-dependent output performance of a base signal at the output of the amplifier circuit in accordance with:

$$P_{Output} = 10 * \log\left[\left[\frac{2 * (U_{High} - U_{Low})}{\pi * \sqrt{2}}\right]^2\right] \Big/ IMP$$

with $U_{high}$: Output voltage high signal $U_{Low}$: Output voltage low signal IMP Impedance of the signal lines in Ohms The amplitude calibration of a signal in a reception branch advantageously takes place in according with the following operations:

Setting the multiple alternation switch MUX to input 3, whereby the output A of the timer TG is directly connected to the multiple alternation switch MUX, and whereby the base signal of the timer has a frequency that is equal to or smaller than the frequency to be calculated in the reception branches KE.

Transfer of the base signal generated in this manner to the output amplifier AT through the calibration line KL and the calibration line switch KLS that is switched to "passage."

Amplification of the base signal through the output amplifier AT, whereby a restriction of the output voltage to the previously measured high and low output voltages takes place. Moreover the output voltage comes very close to an ideal rectangular output signal as a result of the high bandwidth of the output amplifier. This output signal in particular has output performances as defined in accordance with the Fourier series on the base frequency as well as on the odd multiples of the base frequency, whereby the frequency range is restricted for the validity of the Fourier relationship only by the rise and fall rate and by defects in symmetry of the base signal.

Feeding of the generated calibration signal into the reception channel KE that is to be calibrated. Due to the specific frequency properties of the reception channels KE, the corresponding frequency components are selected and gauged on the basis of the calibration signal. This can take place, for example, through a series of amplifier, filter and mixer arrangements to increase the useful frequency range of the reception channel KE.

Calculation of the ratio of the previously known performance of the calibration signal with the corresponding multiples of the base frequency (or also the base frequency itself) and the performance measured through the reception channel KE, which can be used as a calibration value for ascertaining the actual input performances at the corresponding frequencies.

The determination of the intrinsic transit time of a signal between the distributor unit and the amplifier circuit advantageously takes place in accordance with the following operations:

Setting the multiple alternation switch MUX to the input 4, which is connected to the output Q of the J/K flip-flop FF, and setting the calibration line switch KLS to the reflecting state.

Generation of a pulse package by changing over the J/K flip-flop from "hold" to "toggle" through a change of the gate signal at the input J of the J/K flip-flop FF, whereby the J/K flip-flop FF generates a pulse package for the duration of the active release by the gate signal at the input J of the J/K flip-flop FF, whose frequency corresponds to half the frequency of the base signal generated in the timer TG. All pulses within the pulse package are of equal length.

The generated pulse package is forwarded through a distributor unit VN which, for example, comprises further driver amplifiers, to the resistance matrix WM. The pulse package is forwarded via the resistance matrix WM directly to the evaluation unit AE, which is, for example, the analog-digital converter of the reception unit, as well as to the calibration line KL.

The signal forwarded to the calibration line KL is reflected to the calibration line switch KLS that exists in a reflecting state and through the calibration line KL and the resistance matrix WM likewise to the evaluation unit AE. The measured time difference between the reception of the first pulse package and the reflected pulse package corresponds precisely to double the signal transit time on the calibration line KL.

The signal transit time in the output amplifier AT is small in relation to the transit times in the calibration lines KL. Moreover the signal is nearly constant over the frequency range over which a transit time calibration is to be conducted. The deviation amounts to a few picoseconds. The signal transit time within the output amplifier AT can consequently assumed to be constant for all reception branches to be calibrated. Fluctuations in the signal transit time can be disregarded for this reason.

The transit time of a signal in the signal branch to be calibrated is advantageously measured as follows:

Setting the multiple alternation switch MUX to the input 4, which is connected to the output Q of the J/K flip-flop, and setting the calibration switch KLS to "passage". In particular the reception branch KE to be calibrated is set to the corresponding frequency range in which the calibration is to take place.

Generation of a pulse package by changing over the J/K flip-flop FF from "hold" to "toggle" by a change of the gate signal at the input J of the J/K flip-flop FF, whereby the J/K flip-flop FF generates a pulse package for the duration of the active releasing by the gate signal at the input J of the J/K flip-flop FF, whose frequency corresponds to half the frequency in the base signal generated in the timer TG. All pulses inside the pulse package are also of equal length.

The generated pulse package is forwarded through a distributor unit VN, which, for example, comprises additional driver amplifiers, to the resistance matrices WM. Each resistance matrix forwards the pulse package directly to the evaluation unit as well as to the respective calibration line KL.

The signal forwarded to the calibration line KL is amplified by the output amplifier AT and is formed into a rectangular signal, whereby the restriction of the output voltage of the calibration signal to the previously measured high and low output voltages takes place. Here the output voltage of the calibration signal comes very close to an ideal rectangular output signal as a result of the high bandwidth of the output amplifier.

Feeding the calibration signal that is generated into the reception channel KE that is to be calibrated. Due to the specific frequency properties of the reception channels KE, the corresponding frequency components are selected and gauged on the basis of the calibration signal. This can take place, for example, through a series of amplifier, filter and mixer arrangements for the purpose of increasing the useful frequency range of the reception channel KE.

Measuring the transit time difference of the two signals received in the evaluator unit AE, whereby the transit time of the signal in the corresponding signal branch KE corresponds to the temporal difference between the reception time of the base signal from the resistance matrix WM at the evaluation unit AE and the reception time of the calibration signal through the signal branch KE to be calibrated, minus the intrinsic transit time between the distributor unit VM and the calibration switch KLS.

In determining the frequency-specific transit time difference between two or more reception channels KE, the temporal difference is ascertained via a direct comparison of the input times of signals at the respective evaluation units instead of the last enumeration point. Here the respective intrinsic transit time of the calibration arrangement between the distributor unit and the amplifier circuit is to be considered.

As was already explained, the signal transit time in the output amplifier AT is small in relation to the transit times in the calibration lines KE. The signal transit time in the output amplifiers AT can assumed to be constant with a configuration of the same type of output driver used for all input channels KE to be calibrated. To the extent that transit time differences in the reception channels KE (not absolute transit times) are being measured, the transit time of the output amplifier circuit can consequently be disregarded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for generating calibrating signals for calibrating receiving and transmit paths of antenna systems, whereby the receiving and transmit paths are remotely located from calibrating measuring devices comprising:

generating a base signal by means of an arrangement for signal generation comprising a timer, a J/K-flip-flop, and a multiple alternation switch;

feeding said base signal to a distributor unit, said distributor unit distributing said base signal to amplifier circuits on signal distribution lines respectively allocated to said amplifier circuits;

generating said calibration signals at outputs of said amplifier circuits by amplifying said base signal within a specifiable upper amplitude limit and a specifiable lower amplitude limit; and feeding said calibration signals to the respective feed-in points of said signal receiving and transmit paths allocated to said amplifier circuits.

2. The method of claim 1, wherein said each of said amplifier circuits comprises a calibration line switch that is connected directly before an output amplifier, wherein said calibration line switch is switchable between a passage state and a signal-reflecting state, and, in said signal-reflecting state, a signal transit time of said base signal is measured on said signal distribution lines with an evaluation unit, wherein said evaluation unit is connected to a resistance matrix, and wherein said resistance matrix is connected to the respective signal distribution line between said amplifier circuit and said distributor unit.

3. The method of claim 2, wherein one or more additional amplifiers are connected upstream in series from said output amplifier for improving edge steepness of said calibration signal.

4. The method of claim 3, wherein a high frequency bandwidth of said one or more additional amplifiers connected upstream is smaller or equal in relation to said output amplifier.

5. The method of claim 2, further comprising:

generating a low signal for ascertaining said lower amplitude limit, wherein said low signal is conducted through said distributor unit and said signal distribution lines to said amplifier circuits, wherein an output voltage for said low signal is measured at said outputs of said amplifier circuits, and wherein said calibration lead switches of said amplifier circuits are connected in passage.

6. The method of claim 5, wherein a frequency-dependent output performance of said base signal is calculated at said output of each of said amplifier circuits as follows:

$$P_{Output} = 10 * \log\left[\left[\frac{2 * (U_{High} - U_{Low})}{\pi * \sqrt{2}}\right]^2\right] \Big/ IMP$$

with $U_{high}$: Output voltage of said upper amplitude limit $U_{Low}$: Output voltage of said lower amplitude limit IMP: Impedance of said signal distribution lines in Ohms.

7. The method of claim 6, wherein an amplitude of a signal in each of said signal receiving and transmit paths is measured as follows:

switching said calibration line switch of said corresponding amplifier circuit to passage;

conducting said base signal over said corresponding amplifier circuit and said signal receiving and transmit path to be calibrated;

measuring an output of a corresponding signal on an evaluation unit connected to an output of said signal receiving and transmit path to be calibrated;

determining a ratio of said output amplifier of said amplifier circuit and an output ascertained at said output of said signal receiving and transmit path.

8. The method of claim 7, wherein an intrinsic transit time of a signal between said distributor unit and one of said amplifier circuits is measured as follows:

switching said calibration line switch of said amplifier circuit to be gauged into a signal-reflecting state;

conducting said base signal over said distributor unit simultaneously to said evaluation unit that is connected to said resistance matrix and through said signal distribution line to said amplifier circuit, wherein said resistance matrix forwards a signal reflected from said calibration line switch to said evaluation unit;

measuring a transit time difference of both signals received in said evaluation unit, which corresponds to double a transit time between said distributor unit and the calibration line switch.

9. The method of claim 8, wherein the transit time of a signal in the signal receiving and transmit path to be calibrated is measured as follows:

switching said calibration line switch of said corresponding amplifier circuit to passage;

conducting said base signal through said distributor unit simultaneously to said evaluation unit and through signal distribution lines and the amplifier circuit to the feed-in point of said signal receiving and transmit path to be calibrated, wherein an output of said signal receiving and transmit path to be calibrated is connected to said evaluation unit; and measuring a transit time difference between both signals received in said evaluation unit, wherein the transit time of the signal in the corresponding signal receiving and transmit path corresponds to the temporal difference between the input time of the base signal from the resistance matrix at the evaluation unit and the input time of the calibration signal by the signal receiving and transmit path to be calibrated, minus the intrinsic transit time between the distributor unit and the calibration switch.

10. The method of claim 2, further comprising:

generating a high signal for ascertaining said upper amplitude limit, wherein said high signal is conducted through said distributor unit and said signal distribution lines to said amplifier circuits, wherein an output voltage for said high signal is measured at said outputs of said amplifier circuits, and wherein said calibration line switches are connected in passage.

11. The method of claim 10, wherein a frequency-dependent output performance of said base signal is calculated at said output of each of said amplifier circuits as follows:

$$P_{Output} = 10 * \log\left[\left[\frac{2 * (U_{High} - U_{Low})}{\pi * \sqrt{2}}\right]^2\right] \Big/ IMP$$

with $U_{high}$: Output voltage of said upper amplitude limit $U_{Low}$: Output voltage of said lower amplitude limit IMP: Impedance of said signal distribution lines in Ohms.

12. The method of claim 11, wherein an amplitude of a signal in each of said signal receiving and transmit paths is measured as follows:

switching said calibration line switch of said corresponding amplifier circuit to passage;

conducting said base signal over said corresponding amplifier circuit and said signal receiving and transmit path to be calibrated;

measuring an output of a corresponding signal on an evaluation unit connected to an output of said signal receiving and transmit path to be calibrated;

determining a ratio of said output amplifier of said amplifier circuit and an output ascertained at said output of said signal receiving and transmit path.

13. The method of claim 12, wherein an intrinsic transit time of a signal between said distributor unit and one of said amplifier circuits is measured as follows:

switching said calibration line switch of said amplifier circuit to be gauged into a signal-reflecting state;

conducting said base signal over said distributor unit simultaneously to said evaluation unit that is connected to said resistance matrix and through said signal distribution line to said amplifier circuit, wherein said resistance matrix forwards a signal reflected from said calibration line switch to said evaluation unit;

measuring a transit time difference of both signals received in said evaluation unit, which corresponds to double a transit time between said distributor unit and the calibration line switch.

14. The method of claim 13, wherein the transit time of a signal in the signal receiving and transmit path to be calibrated is measured as follows:

switching said calibration line switch of said corresponding amplifier circuit to passage;

conducting said base signal through said distributor unit simultaneously to said evaluation unit and through signal distribution lines and the amplifier circuit to the feed-in point of said signal receiving and transmit path to be calibrated, wherein an output of said signal receiving and transmit path to be calibrated is connected to said evaluation unit; and measuring a transit time difference between both signals received in said evaluation unit, wherein the transit time of the signal in the corresponding signal receiving and transmit path corresponds to the temporal difference between the input time of the base signal from the resistance matrix at the evaluation unit and the input time of the calibration signal by the signal receiving and transmit path to be calibrated, minus the intrinsic transit time between the distributor unit and the calibration switch.

15. The method of claim 1, wherein said base signal is a pulse burst, said generated pulses having a same frequency, pulse width and pulse duty factor.

* * * * *